Patented May 12, 1931

1,804,674

UNITED STATES PATENT OFFICE

HANS T. CLARKE, OF ROCHESTER, NEW YORK, ASSIGNOR TO EASTMAN KODAK COMPANY, OF ROCHESTER, NEW YORK, A CORPORATION OF NEW YORK

PHOTOGRAPHIC SENSITIZER AND PROCESS FOR MAKING IT

No Drawing.   Application filed February 2, 1926. Serial No. 85,588.

This invention relates to photographic sensitizing dyes and methods of preparing them.

It is known that if certain lepidin compounds are treated with strong bases in the presence of formaldehyde or of chloroform there may be obtained dyes having the property of rendering photographic emulsions sensitive to light rays in the infra red region of the spectrum and having a maximum effect at about 740μμ to 760μμ.

I have discovered that if iodoform is used in place of the above mentioned formaldehyde or chloroform, not only are there produced compounds probably identical with and certainly having properties similar to those already known under the name of kryptocyanine, but there are also obtained less soluble by-products which crystallize out at any early stage and have the property of sensitizing photographic emulsions to a useful extent much farther into the infra red and having a very effective range from 780μμ to 900μμ and having a slight sensitizing effect rendering them useful beyond 1100μμ on hypersensitized material and for spectroscopic work where long exposures are possible. Moreover, the yield is much higher with the use of iodoform than when other agents are used. These results are particularly noticeable when an alcoholic solution containing two molecular proportions of lepidin ethiodide and one molecular proportion of iodoform is treated with four molecular proportions of alkali. The iodoform enters into the reaction and is not merely a catalyst.

The following example will illustrate the procedure, parts being given by weight; 30 parts of lepidin ethiodide and 20 parts of iodoform are dissolved in 1000 parts of boiling methyl alcohol. To the boiling solution is added gradually 20 parts of 40% sodium hydroxide solution and 50 parts of methyl alcohol. The mixture is then boiled one hour, and cooled, whereupon there are formed golden green crystals in the form of leaflets, which are filtered off. The filtrate is then concentrated to half its volume and again cooled, whereupon lustrous green needles crystallize out. This last precipitate is analogous to or identical with dyes previously known when lepidin compounds are condensed with substances other than iodoform, and has a maximum effect at about 760μμ. The first precipitate has the properties already mentioned which I have not discovered in products formed when such other substances are used.

Other lepidin alkyl halides, lepidin addition products and quaternary ammonium salts derived from lepidin may be used, including quaternary ammonium salts of bases derived from lepidin by substitution in the benzene nucleus. Some of these are lepidin methiodid; paratolulepidin ethiodide; lepidin ethyl toluenesulphonate; lepidin ethyl sulphate or nitrate; lepidin ethyl benzenesulphonate; and also the corresponding methyl, butyl or propyl salts.

Of the above mentioned salts, the formulæ for paratolepidin ethiodide, lepidin ethyl toluene sulfonate and lepidin ethyl sulfate are respectively:

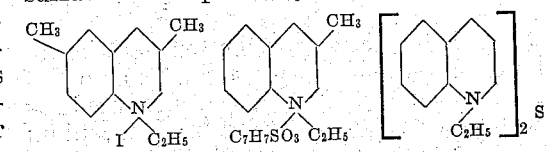

Other strong bases may also be substituted for sodium hydroxide, and other alcohols for methyl alcohol. In all cases, however, iodoform is used. The end-products are apparently not identical when derived from different original lepidin compounds; but in each case there is obtained one product having a maximum sensitizing effect in the region far beyond 760μμ and a second product effective at about 760μμ.

The nature of the reaction, though in some respects obscure, is analogous to the formation of pinacyanole (carbocyanine) from qinaldine ethiodide and alkali.

Following this analogy, the equation for the present reaction should be

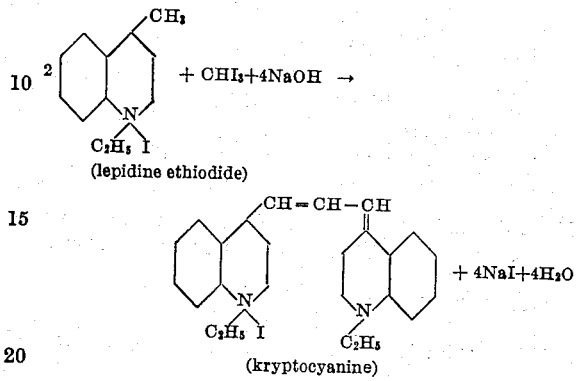

There is produced, however, the additional dye of unknown constitution and having the described sensitizing effect far into the red region. Both of the dyes are, it is to be noticed, produced from lepidine ethiodide, or its equivalents, by a known method by which carbocyanines are produced from the corresponding quinaldine derivatives and this is a typical method. My invention includes such a dye, however made, and particularly when made by one of the known methods of the class just mentioned.

Having thus described my invention, what I claim as new and desire to secure by Letters Patent is:

1. A dye effective for the sensitization of photographic emulsions to that portion of the spectrum beyond 780µµ, produced by the chemical action of a strong base upon a quaternary ammonium salt derived from lepidin, and iodoform, and the crystals of which are in the form of golden green leaflets.

2. A dye effective for the sensitization of photographic emulsions to that portion of the spectrum beyond 780µµ, produced by the chemical action of a strong base upon a lepidin alkyl halide and iodoform, and the crystals of which are in the form of golden green leaflets.

3. A dye effective for the sensitization of photographic emulsions to that portion of the spectrum beyond 780µµ, produced by chemical action of a strong base on lepidin ethiodide and iodoform, and the crystals of which are in the form of golden green leaflets.

4. As a new product, a compound crystallizing in the form of golden green leaflets and effective for sensitizing photographic emulsions to that portion of the spectrum beyond 780µµ and substantially identical with the material produced by the chemical action of a strong base on lepidine ethiodide and iodoform.

5. The process of producing dyes that comprises submitting a quaternary ammonium salt of lepidin to the chemical action of a base in the presence of iodoform.

6. The process of producing dyes that comprises submitting a lepidin alkyl halide to the chemical action of a base in the presence of iodoform.

7. The process of producing dyes that comprises submitting a quaternary ammonium salt of lepidin to the chemical action of a strong base in the presence of iodoform until there is produced a dye effective for sensitizing photographic emulsions to that portion of the spectrum beyond 780µµ.

8. The process of producing dyes that comprises submitting a lepidin alkyl halide to the chemical action of a base in the presence of iodoform until there is produced a dye effective for sensitizing photographic emulsions to that portion of the spectrum beyond 780µµ.

9. The process of producing dyes that comprises submitting lepidin ethiodide to the chemical action of a strong base in the presence of iodoform until there is produced a dye effective for sensitizing photographic emulsions to that portion of the spectrum beyond 780µµ.

10. The process of producing photographic sensitizing dyes that comprises submitting two molecular proportions of lepidin ethiodide to the chemical action in alcoholic solution of four molecular proportions of alkali metal hydroxide and one molecular proportion of iodoform.

11. The process of producing dyes that comprises submitting a quaternary ammonium salt of lepidin to the action of a strong base in the presence of iodoform until there are produced two dyes effective respectively for sensitizing photographic emulsions to that portion of the spectrum beyond 780µµ and in the region about 760µµ.

12. The process of producing dyes that comprises submitting a quaternary ammonium salt derived from lepidin to the action of a strong base in the presence of iodoform until there are produced two dyes effective respectively for sensitizing photographic emulsions to that portion of the spectrum beyond 780µµ and in the region about 760µµ, removing the first dye, concentrating the reaction mixture and then removing the second dye.

Signed at Rochester, New York, this 29th days of January, 1926.

HANS T. CLARKE.